US007249621B2

(12) United States Patent
Sandstrom

(10) Patent No.: US 7,249,621 B2
(45) Date of Patent: Jul. 31, 2007

(54) RUBBER COMPOSITION AND TIRE WITH COMPONENT OF DIENE-BASED ELASTOMER COMPOSITION WITH CORNCOB GRANULE DISPERSION

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 364 days.

(21) Appl. No.: 10/902,334

(22) Filed: Jul. 29, 2004

(65) Prior Publication Data

US 2006/0021688 A1 Feb. 2, 2006

(51) Int. Cl.
*B60C 1/00* (2006.01)
*B60C 11/00* (2006.01)
*B60C 11/14* (2006.01)

(52) U.S. Cl. .............. 152/209.4; 152/209.5; 152/209.7; 152/210; 152/211; 152/458; 152/537; 152/564

(58) Field of Classification Search ............ 152/209.4, 152/209.5, 209.7, 210, 211, 458, 537, 564; 524/15

See application file for complete search history.

(56) References Cited

U.S. PATENT DOCUMENTS

| 2,607,386 | A | | 8/1952 | Pavlik .................. 152/211 |
| 2,739,135 | A | * | 3/1956 | Delang ................ 152/211 |
| 2,806,502 | A | * | 9/1957 | Andy .................. 152/211 |
| 3,697,364 | A | | 10/1972 | Boustany et al. ............. 161/59 |
| 4,519,430 | A | | 5/1985 | Ahmad et al. ............ 152/209 |
| 4,605,696 | A | | 8/1986 | Benko et al. ............. 524/432 |
| 5,049,598 | A | * | 9/1991 | Saito et al. ............. 152/209.4 |
| 5,064,905 | A | * | 11/1991 | Stamhuis et al. ........... 525/237 |
| 5,066,721 | A | | 11/1991 | Hamada et al. ............. 525/102 |
| 5,206,289 | A | | 4/1993 | Sinsky et al. ............. 524/114 |
| 5,227,425 | A | | 7/1993 | Rauline ................ 524/493 |
| 5,616,639 | A | | 4/1997 | Lucas ................. 524/242 |
| 5,886,074 | A | | 3/1999 | Sandstrom et al. ......... 524/291 |
| 5,967,211 | A | * | 10/1999 | Lucas et al. ............ 152/209.4 |
| 6,269,858 | B1 | | 8/2001 | Sandstrom ............. 152/547 |
| 6,378,584 | B1 | * | 4/2002 | Mizuno et al. .......... 152/209.4 |
| 6,391,945 | B2 | * | 5/2002 | Sandstrom ............. 524/492 |
| 6,444,734 | B1 | | 9/2002 | Hergenrother et al. ...... 524/111 |
| 6,881,770 | B2 | * | 4/2005 | Mizuno et al. ............ 524/492 |
| 2006/0000532 | A1 | * | 1/2006 | Sandstrom ............. 524/15 |

FOREIGN PATENT DOCUMENTS

| EP | 905186 | | 3/1999 |
| EP | 1176167 | | 1/2002 |
| EP | 1288022 | * | 3/2003 |
| JP | 2001-47815 | * | 2/2001 |

OTHER PUBLICATIONS

European Search Report.
Brochure, "Grit-o'cobs® Corncob Granules", The Andersons Inc., P.O. Box 119, Maumee Ohio 43537. Published 1998.
Brochure, "The Andersons' Corncob Products", The Andersons Inc., Cob Division, P.O. Box 119, Maumee Ohio 43537.
"Use of Fine-R-Cobs™ as a Filler for Plastics", Reprinted from the 30th International Wire & Cable Symposium, The Andersons Inc., Cob Division, P.O. Box 119, Maumee Ohio 43537. Published at least as early as 1982.
Technical Information, "Fine-R-Cobs™ for Plastics", The Andersons Inc., Cob Division, P.O. Box 119, Maumee Ohio 43537.
Brochure, "The Andersons' Corncob Products", The Andersons Inc., Cob Division, P.O. Box 119, Maumee Ohio 43537, date unknown.
Technical Information, "Fine-R-Cobs™ for Plastics", The Andersons Inc., Cob Division, P.O. Box 119, Maumee Ohio 43537, date unknown.
European Search Report, date Sep. 30, 2005.

* cited by examiner

*Primary Examiner*—Steven D. Maki
(74) *Attorney, Agent, or Firm*—Henry C. Young, Jr.

(57) ABSTRACT

This invention relates to a rubber composition and tire having at least one component of a rubber composition comprised of at least one diene-based elastomer, to the exclusion of butyl type elastomers, which contains an internal dispersion of corncob granules. Such tire component may be, for example, a tire tread and/or cord reinforced rubber ply and/or belt. A tire tread intended for winter driving, although not necessarily limited to winter driving, is provided of a rubber composition containing at least one diene-based sulfur vulcanizable elastomer having a Tg below −30° C. and an internal dispersion therein of corncob granules. The running surface of the tire tread is configured with a combination of micro-protrusions of corncob granules from said corncob granule internal dispersion and micro-cavities therein created by a release of a portion of the protruded corncob granules during the abrading, or wearing, of the tire tread running surface as the tire is being run. At least a portion of said corncob granular micro-protrusions may be covered by a relatively thin membrane of tread rubber. The corncob granules may be colored with a suitable colorant of a non-black color to contrast with the tire tread color to better visualize their presence on the tread running surface. The tire tread rubber composition may optionally also contain a starch/plasticizer composite, sorbitan ester, methylene donor compound, methylene acceptor compound or combination of methylene donor and acceptor compounds, and may be reinforced with carbon black, synthetic amorphous silica aggregates or their combination.

18 Claims, No Drawings

RUBBER COMPOSITION AND TIRE WITH COMPONENT OF DIENE-BASED ELASTOMER COMPOSITION WITH CORNCOB GRANULE DISPERSION

FIELD OF THE INVENTION

This invention relates to a rubber composition and tire having at least one component of a rubber composition comprised of at least one diene-based elastomer, to the exclusion of butyl type elastomers, which contains an internal dispersion of corncob granules. Such tire component may be, for example, a tire tread and/or cord reinforced rubber ply and/or belt. A tire tread intended for winter driving, although not necessarily limited to winter driving, is provided of a rubber composition containing at least one diene-based sulfur vulcanizable elastomer having a Tg below −30° C. and an internal dispersion therein of corncob granules. The running surface of the tire tread is configured with a combination of micro-protrusions of corncob granules from said corncob granule internal dispersion and micro-cavities therein created by a release of a portion of the protruded corncob granules during the abrading, or wearing, of the tire tread running surface as the tire is being run. At least a portion of said corncob granular micro-protrusions may be covered by a relatively thin membrane of tread rubber. The corncob granules may be colored with a suitable colorant of a non-black color to contrast with the tire tread color to better visualize their presence on the tread running surface. The tire tread rubber composition may optionally also contain a starch/plasticizer composite, sorbitan ester, methylene donor compound, methylene acceptor compound or combination of methylene donor and acceptor compounds, and may be reinforced with carbon black, synthetic amorphous silica aggregates or their combination.

BACKGROUND OF THE INVENTION

Various rubber tire components have been proposed for various purposes such as, for example, tire treads for use during winter driving for snow and ice conditions as well as rubber reinforced cord plies and belts.

Rubber tire treads intended for winter driving have sometimes been fitted with metal studs to enhance their traction on icy roads. However, the use of such metal studded tires has sometimes been somewhat restricted at least in part due to potential damage to roads over which they travel.

Rubber tire treads which have a cellular foam rubber, particularly rubber containing closed cells, for their running surfaces have also been proposed for winter traction. For example, see U.S. Pat. Nos. 5,176,765, 5,351,734, 5,788, 786, 6,021,831 and 6,497,261.

Alternatively, some tire treads have been proposed for winter driving conditions which are composed of elastomers which have low glass transition temperatures (Tg's), namely Tg's below −30° C. (e.g. from about −30° C. to about −105° C.). Such low Tg elastomers may inhibit or at least reduce excessive hardening of the tread rubber composition at the very low ambient operating temperatures with a view toward providing softer rubber treads to promote better traction and handling for snow and ice conditions.

Silica reinforcement of selected elastomers has been suggested for tire treads intended for winter conditions. For example, see U.S. Pat. No. 5,616,639.

Other winter tread rubber compositions designed to improve tire traction on ice include the aforesaid use of low Tg rubbers, as well as use of low temperature plasticizers designed to provide a general reduction of the tread composition's hardness at low temperatures.

Historically, substantial amounts of silica reinforcement in combination with a silica coupling agent has sometimes been used as a primary or predominant reinforcement for various rubber blends in rubber tire treads. For example, see U.S. Pat. Nos. 4,519,430; 5,066,721; 5,227,425 and 5,616, 639. Use of various coupling agents to achieve reinforcement of the rubber composition by coupling the silica to the elastomer(s) is well known. However, it is considered herein that such silica/coupler reinforcement is often not, by itself, entirely sufficient for suitable enhanced ice traction for a tire tread.

Tire treads which are silica reinforced with coupling agent which also contain cellulose fibers, wood fibers and/or ceramic hollow spheres have also been suggested for tires to be driven under winter ice conditions. For example, see U.S. Pat. No. 5,967,211.

However, it is considered herein that it remains desired to provide tire treads with enhanced traction for driving under winter conditions as well as for seasonal conditions other than winter conditions.

In the description of this invention, the terms "rubber" and "elastomer" where used herein unless otherwise prescribed, are used interchangeably. The terms rubber "composition" or "compound" where used herein, unless otherwise prescribed, generally refers to a composition in which one or several rubbers are blended or mixed with various ingredients or materials. A term "compounding ingredient" where used herein unless otherwise prescribed, generally refers to ingredients used to prepare rubber compositions, or compounds. Such terms are well known to those having skill in the rubber mixing and compounding art.

The term "corncob granules" is used herein to refer to corncob granules which are obtained from the woody ring surrounding the central core, or pith, of the corncob. The corncob granules are manufactured by drying the woody ring portion, or fraction, of the corncob followed by grinding to produce the granules which are air cleaned and separated into various sizes by mesh screening. Such corncob granules are manufactured by The Andersons, Inc. and sold as Grit-O' cobs® corncob granules, for example as 60 Grit-O' cobs®. For further corncob granule discussion, see "Use of Fine-R-Cobs as a Filler For Plastics", by D. B. Vanderhooven and J. G. Moore, reprinted from the *Internal Wire and Cable Symposium* 1982.

The term "phr", where used herein and according to conventional practice, refers to parts by weight of respective material per 100 parts by weight of rubber.

The Tg of a rubber or rubber compound, where used herein unless otherwise prescribed, refers to its glass transition temperature which can be conventionally determined, for example, by differential scanning calorimeter at a heating rate of 10° C. per minute. It is understood that such Tg determination is well known to those having skill in such art.

The term "butyl type rubber" is used herein in a general sense of a rubbery isobutylene/conjugated diene copolymer or halogenated isobutylene/conjugated diene copolymer which is typically comprised of from about 1 to about 5 weight percent units derived from said diene, wherein the diene is typically isoprene and is typically simply referred to as a butyl rubber. The halogen of said halogenated rubber is typically bromine or chlorine as a brominated butyl rubber or chlorinated butyl rubber. Butyl rubber and halogenated butyl rubbers are well known to those having skill in such art.

SUMMARY AND PRACTICE OF THE INVENTION

In accordance with this invention, a rubber composition is provided which contains at least one conjugated diene-based elastomer to the exclusion of isobutylene copolymer rubbers (e.g. butyl-type rubbers) comprised of, based upon parts by weight per 100 parts by weight of rubber (phr):

(A) about 60 to 100, alternately from about 80 to about 95, phr of at least one conjugated diene-based elastomer having a Tg below −30° C., preferably in a range of from about −40° C. to about −105° C., and, correspondingly, zero to about 40, alternately from about 5 to about 20, phr of at least one diene-based elastomer having a Tg of −30° C. or above, preferably in a range of from about −30° C. to about −10° C.;

(B) about 0.1 to about 30, alternatively about 1 to about 20 phr of corncob granules comprised of granules of the woody ring of corncobs, wherein at least 90 percent of said corncob granules have an average diameter in a range of from about 20 to about 500, alternately from about 30 to about 300, microns;

(C) about 30 to about 110, alternatively about 50 to about 100, phr of reinforcing filler comprised of:
(1) from zero to about 110, alternately about 30 to about 80, phr of amorphous, synthetic precipitated silica aggregates containing hydroxyl groups (e.g. silanol groups) on the surface thereof and
(2) from zero to about 110, alternately from about 30 to about 80, phr of rubber reinforcing carbon black.

In further accordance with this invention, said rubber composition optionally additionally also contains at least one of:

(A) at least one coupling agent, (e.g. from about 0.5 to about 10 phr) having a moiety reactive with hydroxyl groups on said corncob granules and said hydroxyl groups on said precipitated silica and another moiety interactive with at least one of said conjugated diene-based elastomer(s), (B) from zero to about 10, alternately from about 0.5 to about 10, alternately from about 0.5 to about 5, phr of short fibers comprised of at least one of glass fibers and organic fibers selected from nylon, aramid, rayon, cellulose fibers and wood fibers;

(C) a methylene donor and/or acceptor compound (e.g. in an amount of from about 0.1 to about 10 phr of each or their combination), (D) sorbitan ester.

In further accordance with this invention, a pneumatic tire is provided having a component comprised of said rubber composition, particularly where said tire component is selected from a tire tread having an outer running surface comprised of said rubber composition and from a cord reinforced rubber composition such as, for example, a tire ply (e.g. carcass ply and/or circumferential belt ply which underlies a tire tread) comprised of said rubber composition containing at least one reinforcing cord.

In further accordance with this invention, said tire component is a tire tread having a running surface wherein said tread running surface is comprised of said rubber composition which contains micro-protrusions of said corncob granules embedded in its said running surface. (in addition to and as a result of said dispersion of corncob granules within said tire tread rubber composition).

In additional accordance with this invention, said tire component is a tire tread having a running surface wherein said tread running surface is comprised of said rubber composition which contains corncob protrusion-generated micro-cavities thereon formed by a release of a portion of said corncob granule protrusions. (e.g. release, or ejection, of the corncob granule protrusions from the tread running surface resulting from a wearing, or abrading away of the tread surface, as the tire travels over the ground or other substrate).

The combination of corncob granule micro-protrusions and corncob granule promoted micro-cavities, are seen herein to provide a relatively rough texture to the tire tread running surface to consequently promote better, or enhanced, tread traction over the ground and particularly during winter driving conditions.

It is considered herein that said rubber tire tread containing a combination of said corncob dispersion-containing rubber composition, said corncob micro-protrusions on the running surface of said tire tread and said corncob protrusion-generated micro-cavities on its running surface is readily differentiated from a tire tread comprised of closed cellular foam rubber.

Accordingly, in one aspect of this invention, said rubber composition is provided as being exclusive of cellular (foam) rubber, particularly exclusive of closed cell foam rubber, particularly for said tread comprised of said rubber composition which contains said corncob micro-protrusions and said corncob protrusion-derived micro-cavities in its running surface.

In a further aspect of this invention, if desired, said rubber composition is comprised of a closed cell-containing rubber (foam rubber), particularly for said tire tread comprised of said rubber composition wherein said tire tread contains said corncob micro-protrusions and said corncob protrusion-derived micro-cavities in its running surface.

In further accordance with the invention, a tire is provided with a rubber tread wherein the running surface of said tread is configured with a plurality of longitudinal, circumferential rubber zones wherein the running surface of at least one of said tread zones is a circumferential longitudinal specialized tread strip comprised of the tread rubber composition of this invention which contains a combination of said corncob protrusions and said corncob protrusion generated micro-cavities.

For said tire tread having a running surface configured with a plurality of circumferential tread zones (in an axially disposed relationship to each other), (A) said circumferential longitudinal specialized rubber tread strip is positioned adjacent Ouxtapositioned) to an additional circumferential longitudinal rubber tread strip which does not contain said corncob granule protrusions, or corncob granule protrusion-generated micro-cavities, or (B) said circumferential longitudinal specialized rubber tread strip is positioned on the centerline of the tread between two additional circumferential longitudinal rubber tread strips which do not contain said corncob granule protrusions or corncob granule protrusion-generated micro-cavities, or (C) said circumferential longitudinal specialized rubber tread strip is positioned adjacent (next to) an additional tread rubber strip wherein said additional tread rubber strip is positioned on the centerline of the tire tread and does not contain said corncob granule protrusions or corncob granule protrusion-generated micro-cavities.

With regard to the zoned tire tread, it is considered herein that the tire with a tread running surface, or individual circumferential tread running surface strip of a zoned tread running surface, having both the combination of corncob granule protrusions from and corncob protrusion-generated micro-cavities in the tread running surface together with the substantial low Tg elastomer content in the tread rubber composition itself, promotes an enhanced winter driving ability (e.g. traction enhancement) for the associated tire having such tread.

In additional accordance with one aspect of the tire tread for this invention, the said corncob granules may be colored with a non-black colorant to enhance their visibility, particularly the visibility of the corncob micro-protrusions, on a black-colored tread running surface background (the tread running surface itself being black colored as a result of containing carbon black reinforcement). Such colorant may be, for example, a suitable dye or stain.

In additional accordance with this invention, the said rubber composition, and particularly the said tire component may contain a methylene donor and/or methylene acceptor compound, particularly where said tire component is a cord reinforced ply (cord reinforced rubber composition which may be referred to as a rubber composition containing cord reinforcement).

In practice, as hereinbefore pointed out, said cord of said cord reinforced rubber composition may be comprised of, for example, filaments comprised of at least one of nylon, aramid, polyester, and rayon filaments.

In one aspect of the invention, it may be desired for the said rubber composition, and particularly the said tread rubber composition, to contain short fibers which can also provide a combination of fibrous protrusions and associated fiber-generated micro-cavities in the running surface of the tire tread to further promote winter driving ability for a tread having the tread of this invention. Short fibers include, for example, short glass and organic fibers such as nylon, aramid, cellulose and rayon fibers. In one aspect, such short cellulose fibers can include wood fibers which themselves are a form of cellulose fibers except that they also contain lignins.

The combination of the corncob granules and precipitated silica particles together with the chemical bonding of such materials (granules and particles) to the low Tg elastomer(s) by the coupling agent in the said rubber composition, and particularly the said tire component and particularly the said tire tread rubber composition, to ultimately form a combination of corncob granule micro-protrusions and associated micro-cavity depressions in the running surface of the tread is a significant departure from past practice, particularly insofar as tire treads intended for winter driving is concerned.

It is considered, for example, that a complex reinforcing network is formed in situ within the elastomer host (the rubber composition) by the interaction of a moiety of the coupling agent with the hydroxyl groups of the corncob granules, and hydroxyl groups of the precipitated silica aggregates, as well as hydroxyl groups of the cellulose fibers, if used, and the other (and different) moiety of the coupling agent interacts with the carbon-to-carbon bonds of the diene-based elastomer host.

For example, and in one aspect of the practice of the invention, in the case of a coupling agent containing an alkoxysilane moiety and another moiety as a polysulfide and/or mercapto moiety, said alkoxysilane moiety is seen herein to react with said hydroxyl groups of corncob granules and said precipitated silica aggregates and the polysulfide and/or mercapto moiety of the coupling agent is seen herein to interact with carbon-to-carbon bonds of the diene-based elastomer(s) within the elastomer host.

It is considered herein that an additional moiety of the coupling agent, such as for example a polysulfide bridge or mercapto moiety contained in the coupling agent, reacts with the diene-based elastomer(s) during the processing and/or curing of the rubber composition at an elevated temperature, to thereby couple said corncob granules and precipitated silica aggregates to the elastomer(s) of the rubber composition of the tread compound.

Such coupling reaction for precipitated silica aggregates themselves is recognized by those having skill in such art to be important for reinforcement of rubber compositions for use in tire treads.

In this invention, it is considered that the aforesaid additional coupling reaction of the said corn cob granules to the diene-based elastomer(s) in situ within the elastomer host is important to enhance the tire tread's ice traction by tending to provide a degree of anchoring (bonding) of the microprotusion of the corncob granules to the running surface of the tire tread and limit the degree of formation of associated micro-cavities in the tire tread running surface during the running of the tire (working of the tire) as it runs on an associated vehicle over a suitable road surface.

In practice and in one aspect of the invention, it is believed that the said corncob granules work by increasing the effective frictional surface of the tire tread that contacts the ice, such as for example, by the friction of the tire tread on the road surface causing the rubber to abrade away to both partially expose more corncob granule micro-protrusions form the internal corncob granule dispersion and to create additional micro-cavities on the tread running surface itself, all resulting in an increased effective frictional surface of the tire tread compared to a smooth tread running without such corncob granule additive. After running the tires on the road, a visual observation of the tire tread surface may reveal numerous corncob granule micro-protrusions somewhat anchored in the surface which are partially exposed. It is acknowledged that, as the corncob granules abrade against a road surface as the tire is run on a road, a portion of the granules may become modified, or fractured or otherwise broken. Additionally when such corncob granules are removed by the friction of the tire on the road, the tire tread's running surface becomes significantly rougher in a sense of the resulting microporous cavities than that of a tire rubber tread running surface without such corncob granules contained in the tire tread rubber composition, all of which is considered to aid in winter driving for the associated tire. This, then, is a hypothesis as how an improved, or at least enhanced, tire tread running surface is provided by this invention for a winter tire driving.

It is also to be appreciated that upon the tire being manufactured, the corncob granule micro-protrusions at the tread running surface resulting from the internal corncob granule dispersion are primarily inherently covered by a thin rubber membrane, as a result of the tire manufacturing process, which wears away as the tire is being run to visually expose the corncob granule protrusions.

As hereinbefore indicated, it is considered important that a majority of the elastomers for the tire tread rubber composition have a Tg below −30° C. to inhibit, or avoid, excess tread rubber composition hardening at very low ambient temperature operating conditions such as might be experienced in wintertime driving of an associated vehicle.

Representative of such low Tg elastomers, and so long as they have a Tg of less than −30° C., are for example, high cis 1,4-polybutadiene containing at least 92 percent cis 1,4-structure, medium cis 1,4-polybutadiene having about 35 to about 45, usually about 42, percent cis 1,4-structure, medium vinyl polybutadiene having about 40 to about 70 percent vinyl 1,2-content and a Tg in a range of about −30° C. to about −60° C., cis 1,4-polyisoprene which may be natural rubber, isoprene/butadiene copolymers, styrene/butadiene copolymers, styrene/isoprene copolymers and styrene/isoprene/butadiene terpolymers. It is recognized that versions of one or more of such elastomers may also have variations which exhibit Tg's at or above −30° C., however, it is an important aspect of this invention that only the variations of such elastomers which have Tg's lower than −30° C. are selected. Thus, versions of such elastomers such as, for example, 3,4-polyisoprene, emulsion polymerization prepared styrene/butadiene copolymer elastomers containing at least about 40 percent units derived from styrene, and high vinyl polybutadiene elastomers containing greater than 70 percent 1,2-vinyl groups, to the extent that such versions of such elastomers Tg's are above −30° C., are intended to be present only as a minority of the elastomers contained in the tire treads for this invention.

In the practice of the invention, the said starch/plasticizer composite may be described, for example, as a particulate composite of starch and plasticizer therefor. Such starch may be comprised of amylose units and amylopectin units in a ratio of, for example, about 10/90 to about 35/65, alternatively about 20/80 to about 30/70, and has a softening point according to ASTM No. D1228 in a range of about 180° C. to about 220° C.; and the starch/plasticizer composite itself having a softening point in a range of about 110° C. to about 170° C. according to ASTM No. D1228.

In practice, the starch/plasticizer composite is desirably a free flowing, dry powder or in a free flowing, dry pelletized form. In practice, it is desired that the synthetic plasticizer itself is compatible with the starch, and has a softening point lower than the softening point of the starch so that it causes the softening of the blend of the plasticizer and the starch to be lower than that of the starch alone.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylenevinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

The synthetic plasticizer(s) may be of a viscous nature at room temperature, or at about 23° C. and, thus, considered to be a liquid for the purposes of this description, although the plasticizer may actually be in a form of a viscous liquid at room temperature since it is to be appreciated that many plasticizers are polymeric in nature.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate and more preferably a poly(ethylenevinyl alcohol) which may have, for example, a vinylalcohol/ethylene mole ratio of about 60/40 and a molecular weight, for example, of about 11700 with an average particle size of, for example, about 11.5 microns or a molecular weight (weight average) of, for example, about 60,000 with an average particle diameter of, for example, less than 50 microns.

Various blends of starch and ethylenevinyl alcohol copolymers can then be prepared according to mixing procedures well known to those having skill in such art.

Other plasticizers might be used, for example and so long as they have the appropriate Tg and starch compatibility requirements, by reacting one or more appropriate organic dibasic acids with aliphatic or aromatic diol(s) in a reaction which might sometimes be referred to as an esterification condensation reaction. Such esterification reactions are well known to those skilled in such art.

In the practice of this invention, said rubber composition of said tire component, particularly a tire tread having a visually exposed, or visually observable, running surface may contain a sorbitan ester to aid in masking, retarding, and possibly essentially eliminating for an extended period of time, a dulling and/or discoloring (usually browning) of the exposed surface of the tire tread surface which contains the said corncob granular protrusions and said micro-cavities.

Such sorbitan esters are considered herein as being both non-polar and polar in nature along its chemical molecule. The non-polar portion of the molecule should exhibit limited compatibility with the diene based elastomers, whereas the polar portion will be somewhat incompatible and tend to migrate to the cured rubber surface.

In practice, it is considered herein that such incompatibility of the polar function of the sorbitan ester, in combination of its relatively low molecular weight, relatively low viscosity, and/or relatively low melting point, enhances its tendency to migrate to the visual surface of the tire component and tend to create a continuous film on the surface which can mask the aforesaid discoloration and/or dullness of the surface caused by migration of other ingredients within the rubber composition to its visible surface and exposure to atmospheric elements.

Representative examples of such sorbitan esters are, for example, those selected from sorbitan stearate, sorbitan monoopleate, sorbitan dioleate and sorbitan laurate.

An additional discussion concerning use of sorbitan esters may be found, for example, in U.S. Pat. No. 6,444,734.

In the practice of this invention, the rubber composition for said tire component, particularly the component as a cord reinforced rubber composition, may contain a methylene donor, methylene acceptor, compound or their combination.

Representative examples of such methylene donor compounds are, for example, hexamethoxymethyolmelamine (preferable), hexaethoxymethylmelamine, ethoxymethylpyridinium chloride, N,N'N"-trimethyhlolmelamine, N-methylolmelamine and N',N"-dimethylolmelamine as well as hexamethylenetetramine (which may be preferable for some uses). For example, see U.S. Pat. No. 5,886,074.

Representative examples of methylene acceptor compounds are, for example, resorcinol, resorcinol monobenzoate, phenolic cashew nut oil resin and polyhydric phenoxy resin. For example, see U.S. Pat. Nos. 5,206,289 and 4,605,696.

For a further practice of this invention, for a tire component of a rubber composition which contains starch or starch/plasticizer composite, said rubber composition may contain such methylene donor compound (usually to the exclusion of said hexamethylenetetramine) and/or methylene acceptor compound. For example, see U.S. Pat. No. 6,269,858.

In the practice of this invention, numerous coupling agents taught for use in coupling silica and diene-based elastomers may be used for coupling both the silica and the said additives (e.g. corncob granules, cellulose fibers, starch/plasticizer composites, to a greater or less degree, depending somewhat upon the additive) to the diene-based elastomer(s) of the tire tread rubber composition. For example, various alkoxy silane based coupling agents recited in the aforesaid enumerated patents might be used which contain a polysulfide bridge such as, for example, bis(trialkoxysilylalkyl) polysulfide having from about 2 to about 8, usually an average of about 2 to about 5, sulfur atoms in the sulfur bridge where such alkyl groups may be selected from, for example, methyl, ethyl and propyl radicals, with the alkoxy groups preferably being selected from methoxy and ethoxy groups. A representative example might be bis(triethoxysilylpropyl) polysulfide.

Other coupling agents may be, for example, alkoxyorganomercaptosilanes, and particularly blocked alkoxyorganomercaptosilanes.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

The siliceous pigment (silica) may, for example, have a BET surface area, as measured using nitrogen gas, is in a range of about 80 to about 300, although more usually in a range of about 100 to about 200, although perhaps even up to about 360, square meters per gram ($m^2/g$). The BET method of measuring surface area is described in the *Journal of the American Chemical Society,* Volume 60, Page 304 (1930).

The silica may typically have a dibutylphthalate (DBP) adsorption value in a range of about 150 to about 350, and usually about 200 to about 300 cubic centimeters per 100 grams (cc/100 g).

Various commercially available silicas may be considered for use in this invention such as, for example only and without limitation, silicas commercially available from PPG Industries under the Hi-Sil trademark with designations 210, 243, etc; silicas available from Rhone-Poulenc. such as, for example, Zeosil™ 1165MP and silicas available from Degussa AG with designations such as, for example, VN2, VN3, BV 3370GR and silicas from J. M Huber Company such as, for example, Hubersil 8745.

It is readily understood by those having skill in the art that the rubber composition of the tread rubber would be compounded by methods generally known in the rubber compounding art, such as mixing the various sulfur-vulcanizable constituent diene polymers with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example, silica and silica-carbon black mix. As known to those skilled in the art, depending on the intended use of the sulfur vulcanizable and sulfur vulcanized compounds or tread compounds, the additives mentioned above are selected and commonly used in conventional amounts.

Typical additions of carbon black and silica, for this invention, are hereinbefore set forth. Various carbon blacks, particularly rubber reinforcing blacks might be used. For example, although such examples are not intended to be limitive, are of the ASTM designation type N-299, N-234, N-220, N-134, N-115, and N-110. The selection of the type of carbon black is well within an optimization skill by one having skill in the rubber compounding for tire treads, depending somewhat upon the intended use, purpose and properties for the tire tread. Typical amounts of tackifier resins, if used, comprise about 0.5 to about 10 phr, usually about 1 to about 5 phr. Typical amounts of processing aids comprise about 1 to about 80 phr. Such processing aids can include, for example, aromatic, naphthenic, and/or paraffinic processing oils or plasticizer or medium molecular weight polyesters. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. An antioxidant may be, for example, of the paraphenylene diamine and/or dihydrotrimethylquinoline type.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemerital sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization on-set.

In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate the cure and to improve the properties of the vulcanizate. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The selection and amounts of most of the various compounding ingredients are not considered to be critical for the purposes of this invention, except where they may be especially emphasized elsewhere in this description, and can be adjusted or modified by the practitioner as deemed suitable for the desired tire tread properties.

The tire can be built, shaped, molded and cured by various methods which will be readily apparent to those having skill in such art.

The rubber composition may be and is preferably prepared by thermomechanically working and mixing the diene-based rubber and other rubber compounding ingredients, exclusive of the rubber curatives, in at least one sequential mixing step with at least one mechanical mixer, usually an internal rubber mixer, (usually referred to as "non-productive" mix stages), to a temperature which may be in a range of, for example, about 150° C. to about 190° for a sufficient duration of time, which may be, for example, within about 4 to about 8 minutes, followed by a final mix stage (usually referred to as a "productive mix stage) in which the curatives, such as sulfur and accelerators, are added and mixed therewith which may be, for example, about 1 to about 4 minutes to a temperature which may be, for example, within a range of about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (A) adjusting the motor speed of the mixer, namely reducing the motor speed after the desired temperature of the rubber composition is reached, in a variable speed mixer or by (B) utilizing two or more sequential mix stages sufficient to satisfy the duration requirement for the aforesaid maximum mixing temperature maintenance.

Vulcanization of the rubber compositions are generally carried out at conventional temperatures which may range, for example, from about 100° C. to about 200° C. Usually preferably, the vulcanization is conducted at temperatures ranging from 120° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Tread Rubber Composition

Samples of diene hydrocarbon based rubber compositions are prepared and are identified herein as Samples 1 through 5, with Sample 1 being a Control Sample.

Control Sample 1 contains cis 1,4-polyisoprene natural rubber having a Tg of about −65° C. and a emulsion polymerization prepared styrene/butadiene copolymer elastomer (E-SBR) having a Tg of about −55° C.

Samples 2 through 5 are similar to the Control Sample 1 except that they contain various amounts of corncob granules.

The compositions were prepared by mixing the ingredients in several stages, namely, two sequential non-productive mixing steps (without the curatives, namely the sulfur and accelerators) followed by a productive mix stage (in which the curatives are added), and the resulting composition was cured under conditions of elevated pressure and temperature.

For the non-productive mixing stages, the ingredients are mixed in an internal rubber mixer for about 4 minutes each to a temperature of about 160° C. following which the rubber composition is removed from the mixer, roll milled, sheeted out and allowed to cool to a temperature below 40° C. after each non-productive mixing stage.

In a subsequent productive mixing stage, the curatives are mixed with the rubber composition in an internal rubber mixer for about 2 minutes to a temperature of about 110° C. following which the rubber composition is removed from the mixer, roll milled, sheeted out and allowed to cool to a temperature below 40° C.

The rubber compositions are illustrated in the following Table 1.

TABLE 1

| | Samples | | | | |
|---|---|---|---|---|---|
| | 1 | 2 | 3 | 4 | 5 |
| First Non-Productive Mixing Step | | | | | |
| E-SBR[1] | 85 | 85 | 85 | 85 | 85 |
| Natural rubber[2] | 15 | 15 | 15 | 15 | 15 |
| Carbon black[3] | 49 | 49 | 49 | 49 | 45 |
| Processing aids[4] | 18 | 18 | 18 | 18 | 18 |
| Antidegradant[5] | 3.5 | 3.5 | 3.5 | 3.5 | 3.5 |
| Zinc oxide | 0.9 | 0.9 | 0.9 | 0.9 | 0.9 |
| Corncob granules[6] | 0 | 2.5 | 5 | 10 | 10 |
| Second Non-Productive Mixing Step | | | | | |
| Carbon black[3] | 16 | 16 | 16 | 16 | 16 |
| Processing aids[4] | 12.5 | 12.5 | 12.5 | 12.5 | 12.5 |
| Productive Mixing Step | | | | | |
| Zinc oxide | 2.1 | 2.1 | 2.1 | 2.1 | 2.1 |
| Antidegradant[5] | 1.2 | 1.2 | 1.2 | 1.2 | 1.2 |
| Accelerator(s)[7] | 2.7 | 2.7 | 2.7 | 2.7 | 2.7 |
| Sulfur | 1.6 | 1.6 | 1.6 | 1.6 | 1.6 |
| Retarder | 0.5 | 0.5 | 0.5 | 0.5 | 0.5 |

[1]Styrene/butadiene copolymer elastomer as PLF1502 ™ from The Goodyear Tire & Rubber Company containing about 23.5 percent bound styrene and having a Tg of about −55° C.
[2]Cis 1,4-polyisoprene natural rubber (TSR20)
[3]N550 rubber reinforcing carbon black, ASTM designation
[4]Rubber processing oil and microcrystalline wax as processing aids and fatty acid as primarily stearic acid
[5]Of the quinoline and amine types
[6]Corncob granules as 60 Grit-O' cobs ® from The Andersons, Inc.
[7]Benzothiazyl disulfide and tetramethyl thiuram disulfide The following Table 2 reports physical data for various physical properties of the Samples. For cured rubber samples, the respective samples were cured for about 60 minutes to a temperature of about 160° C.

TABLE 2

|  | Samples | | | | |
| --- | --- | --- | --- | --- | --- |
|  | 1 | 2 | 3 | 4 | 5 |
| Carbon black | 65 | 65 | 65 | 65 | 61 |
| Corncob granules | 0 | 2.5 | 5 | 10 | 10 |
| Rheometer, 170° C. (MDR)[1] | | | | | |
| Maximum torque (dNm) | 13.3 | 13.6 | 13.6 | 13.5 | 13 |
| Minimum torque (dNm) | 1.9 | 2 | 1.7 | 2 | 1.9 |
| Delta torque (dNm) | 11.4 | 11.6 | 11.9 | 11.5 | 11.1 |
| T90, minutes | 7.5 | 7.7 | 7.8 | 8.1 | 8.1 |
| Stress-strain (ATS)[2] | | | | | |
| Tensile strength (MPa) | 17.6 | 15.5 | 15 | 13.2 | 13.3 |
| Elongation at break (%) | 577 | 531 | 533 | 526 | 540 |
| 300% modulus, ring (MPa) | 8.1 | 8 | 7.9 | 7.2 | 6.7 |
| Rebound (%) | | | | | |
| 23° C. | 30 | 29 | 30 | 30 | 31 |
| 100° C. | 42 | 41 | 42 | 42 | 42 |
| Hardness (Shore A)[3] | | | | | |
| 23° C. | 71 | 71 | 73 | 73 | 73 |
| 100° C. | 57 | 58 | 59 | 59 | 58 |
| Tear strength, 95° C. (N)[4] | 193 | 165 | 138 | 113 | 65 |
| Pierced groove flex (mm @ 120 minutes)[5] | 0.54 | 0.55 | 0.64 | 0.62 | 0.69 |
| DIN abrasion (2.5N) relative cc loss[6] | 132 | 145 | 156 | 183 | 190 |
| RPA, 100° C.[7] | | | | | |
| G' at 10% strain (kPa) | 970 | 1004 | 1004 | 964 | 905 |
| Tan delta at 10% strain | 0.254 | 0.259 | 0.259 | 0.261 | 0.246 |
| Sample surface visual observation ratings[8] | 1 | 2 | 3 | 5 | 5 |

[1]Data obtained according to Moving Die Rheometer instrument, model MDR-2000 by Alpha Technologies, used for determining cure characteristics of elastomeric materials, such as for example torque, T90 etc.
[2]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Shore A hardness according to ASTM D-1415
[4]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[5]Pierced groove flex values were determined by continuous dynamic flexing and measuring the extent of crack growth and expressed in terms of millimeters (mm) at 240 minutes of flexing at 23° C.
[6]DIN abrasion (relative to a control) according to DIN 53516
[7]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[8]Sample surface roughness using a graduated visual observation rating of from 1 to 5 with a rating of 1 for a smooth rubber surface and a rating of 5 for a relatively very rough rubber surface (caused by the corncob granules of which the majority are covered by a relatively thin rubber membrane).

From Table 2 it is observed that the rebound and hardness properties remained fairly constant with the addition of 2.5 to 10 phr of the corncob granules. However, tensile strength, tear strength and DIN abrasion properties became somewhat worse than those for the Control Sample, particularly at the 10 phr level of corncob granule addition.

From Table 2 it is also observed that the cured Samples exhibited very small overall micro protrusions of the corncob granules, with the majority being covered by thin rubber membrane at the surface and also that abraded and torn portions of the respective Samples exhibited numerous micro-cavities resulting from the displacement of individual protruded corncob granules. The resulting increase of the surface area and edges due to the presence of both the micro protrusions and micro-cavities are considered herein to provide increased traction particularly for winter driving conditions for a tire having a tread of the rubber composition.

EXAMPLE II

Sidewall Rubber Composition

Samples of diene hydrocarbon based rubber compositions are prepared and are identified herein as Samples 6 through 9, with Sample 6 being a Control Sample.

Control Sample 6 contains cis 1,4-polyisoprene natural rubber having a Tg of about −65° C. and a cis 1,4-polybutadiene rubber having a Tg of about −103° C.

Samples 7 through 9 are similar to Control Sample 6 except that they contain various amounts of corncob granules.

The compositions were prepared in the manner of Example I.

The rubber compositions are illustrated in the following Table 3.

TABLE 3

| | Sample | | | |
|---|---|---|---|---|
| | 6 | 7 | 8 | 9 |
| Non-Productive Mixing Step | | | | |
| Natural rubber[1] | 55 | 55 | 55 | 55 |
| Cis 1,4-polybutadiene rubber[2] | 45 | 45 | 45 | 45 |
| Carbon black[3] | 48 | 48 | 48 | 48 |
| Processing aids[4] | 14.8 | 14.8 | 14.8 | 14.8 |
| Antidegradant[5] | 5.3 | 5.3 | 5.3 | 5.3 |
| Zinc oxide | 2 | 2 | 2 | 2 |
| Corncob granules[6] | 0 | 2.5 | 5 | 10 |
| Productive Mixing Step | | | | |
| Zinc oxide | 3 | 3 | 3 | 3 |
| Antidegradant[5] | 1 | 1 | 1 | 1 |
| Accelerators[7] | 2.6 | 2.6 | 2.6 | 2.6 |
| Sulfur | 0.7 | 0.7 | 0.7 | 0.7 |

[1]Cis 1,4-polyisoprene natural rubber (TSR20)
[2]Cis 1,4-polybutadiene rubber as BUD 1207 ™ from The Goodyear Tire & Rubber Company having a Tg of about −103° C.
[3]N550 rubber reinforcing carbon black, ASTM designation
[4]Rubber processing oil and microcrystalline wax as processing aids and fatty acid as primarily stearic acid
[5]Of the quinoline and amine types
[6]Corncob granules as 60 Grit-O' cobs ® from The Andersons, Inc.
[7]Benzothiazyl disulfide and tetramethyl thiuram disulfide The following Table 4 reports physical data for various physical properties of the Samples. For cured rubber samples, the respective samples were cured for about 60 minutes to a temperature of about 160° C.

TABLE 4

| | Sample | | | |
|---|---|---|---|---|
| | 6 | 7 | 8 | 9 |
| Corncob granules | 0 | 2.5 | 5 | 10 |
| Rheometer, 160° C. (MDR)[1] | | | | |
| Maximum torque (dNm) | 16.2 | 16.7 | 16.8 | 17.4 |
| Minimum torque (dNm) | 2.1 | 2.3 | 2.3 | 2.6 |
| Delta torque (dNm) | 14.1 | 14.4 | 14.5 | 14.8 |
| T90, minutes | 12.3 | 11.7 | 11.7 | 11 |

TABLE 4-continued

| | Sample | | | |
|---|---|---|---|---|
| | 6 | 7 | 8 | 9 |
| Stress-strain (ATS)[2] | | | | |
| Tensile strength (MPa) | 17.5 | 15.6 | 14.6 | 12.9 |
| Elongation at break (%) | 528 | 499 | 488 | 473 |
| 300% modulus, ring (MPa) | 7.5 | 7.5 | 7.3 | 7 |
| Rebound (%) | | | | |
| 23° C. | 49 | 48 | 49 | 48 |
| 100° C. | 59 | 58 | 58 | 57 |
| Hardness (Shore A)[3] | | | | |
| 23° C. | 60 | 61 | 62 | 63 |
| 100° C. | 57 | 58 | 58 | 60 |
| Tear strength, 95° C. (N)[4] | 92 | 95 | 94 | 102 |
| Pierced groove flex (mm @ 240 minutes)[5] | 0.59 | 0.74 | 0.55 | 0.6 |
| Sample surface visual observation[8] | 1 | 2 | 3 | 5 |
| Static ozone test | | | | |
| 50 pphm, at 23° C., 25% strain | No visual surface cracks | | | |
| Dynamic ozone test | | | | |
| 50 pphm, 13° C., 25% strain | Edge cracks only | | | |

From Table 4 it is observed that the addition of the corncob granules at a level of from 2.5 to 10 phr had a small effect on cured properties except for a reduction of tensile strength at the 10 phr level.

EXAMPLE III

Rubber Composition for Cord Reinforcement

Samples of diene hydrocarbon based rubber compositions are prepared and are identified herein as Samples 10 through 13, with Sample 10 being a Control Sample.

Control Sample 10 contains both natural and synthetic cis 1,4-polyisoprene rubbers.

Samples 11 through 13 are similar to Control Sample 10 except that Samples 11 and 13 each contain 5 phr of corncob granules and Samples 12 and 13 contain a combination of methylene acceptor and methylene donors.

The compositions were otherwise prepared in the manner of Example I.

The rubber compositions are illustrated in the following Table 5.

TABLE 5

| | Sample | | | |
|---|---|---|---|---|
| | 10 | 11 | 12 | 13 |
| First Non-Productive Mixing Step | | | | |
| Natural cis 1,4-polyisoprene rubber[1] | 50 | 50 | 50 | 50 |
| Synthetic cis 1,4-polyisoprene rubber[2] | 50 | 50 | 50 | 50 |
| Carbon black[3] | 60 | 60 | 60 | 60 |
| Processing aids and tackifier[4] | 2 | 2 | 2 | 2 |
| Fatty acid[5] | 2 | 2 | 2 | 2 |
| Zinc oxide | 5 | 5 | 5 | 5 |
| Methylene acceptor[6] | 0 | 0 | 2 | 2 |
| Corncob granules[7] | 0 | 5 | 0 | 5 |
| Second Non-Productive Mixing Step | | | | |
| Additional mixing step without addition of additives | | | | |
| Productive Mixing Step | | | | |
| Methylene donor[8] | 0 | 0 | 3 | 3 |
| Antidegradant[9] | 0.75 | 0.75 | 0.75 | 0.75 |

TABLE 5-continued

|  | Sample | | | |
| --- | --- | --- | --- | --- |
|  | 10 | 11 | 12 | 13 |
| Zinc oxide | 3 | 3 | 3 | 3 |
| Sulfur | 5 | 5 | 5 | 5 |
| Accelerator and retarder[10] | 1.2 | 1.2 | 1.2 | 1.2 |

[1]Cis 1,4-polyisoprene natural rubber (TSR20)
[2]Cis 1,4-polyisoprene synthetic rubber as NAT2200 ™ from The Goodyear Tire & Rubber Company having a Tg of about −65° C.
[3]N550 rubber reinforcing carbon black, ASTM designation
[4]Rubber processing oil and microcrystalline wax as processing aids and hydrocarbon resin
[5]Primarily stearic acid
[6]Resorcinol
[7]Corncob granules as 60 Grit-O' cobs ® from The Andersons, Inc.
[8]Hexamethoxymethylmelamine
[9]Benzothiazyl disulfide and tetramethyl thiuram disulfide
[10]Sulfenamide type accelerator and phthalimide retarder The following Table 6 reports physical data for various physical properties of the Samples. For cured rubber samples, the respective samples were cured for about 25 minutes at a temperature of about 170° C.

TABLE 6

|  | Sample | | | |
| --- | --- | --- | --- | --- |
|  | 10 | 11 | 12 | 13 |
| Corncob granules | 0 | 5 | 0 | 5 |
| Methylene donor | 0 | 0 | 3 | 3 |
| Methylene acceptor | 0 | 0 | 2 | 2 |
| Rheometer, 170° C. (MDR)[1] | | | | |
| Maximum torque (dNm) | 24.2 | 25.1 | 33.2 | 34.3 |
| Minimum torque (dNm) | 2.1 | 2.3 | 2.7 | 2.9 |
| Delta torque (dNm) | 22.1 | 22.8 | 30.5 | 31.4 |
| T90, minutes | 3.8 | 3.7 | 4.7 | 4.7 |
| Stress-strain (ATS)[2] | | | | |
| Tensile strength (MPa) | 17.4 | 15.2 | 12.5 | 10.5 |
| Elongation at break (%) | 436 | 404 | 273 | 237 |
| 300% modulus, ring (MPa) | 11 | 11 | — | — |
| Rebound (%) | | | | |
| 23° C. | 38 | 38 | 42 | 41 |
| 100° C. | 51 | 53 | 52 | 51 |
| Hardness (Shore A)[3] | | | | |
| 23° C. | 69 | 69 | 81 | 81 |
| 100° C. | 64 | 65 | 78 | 78 |
| Tear strength, 95° C. (N)[9] | 108 | 106 | 85 | 72 |
| Cord adhesion to polyester cord (N)[10] | 154 | 158 | 183 | 248 |
| Cord adhesion to nylon cord, nylon (N)[11] | 181 | 208 | 214 | 228 |

[10,11]Cord adhesion according to a pull out test of a cord embedded in a rubber sample (presented herein simply to compare one Sample to the other Sample on a relative basis) generally referred to a TCAT type of test (Tire Cord Adhesion Test) referred to, in general, in U.S. Pat. No. 4,095,465 expressed in units of Newtons.

From Table 6 it is observed that adhesion to polyester and nylon cord was slightly increased by addition of the corncob granules (Sample 11 as compared to Control Sample 10).

In the case where the methylene donor and acceptor are present along with the corncob granules (Sample 13 as compared to Control Sample 10) the adhesion values were further increased.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire with a tread having an outer running surface comprised of a rubber composition which contains at least one conjugated diene-based elastomer to the exclusion of isobutylene copolymer rubbers comprised of, based upon parts by weight per 100 parts by weight of rubber (phr):
   (A) about 60 to 100 phr of at least one conjugated diene-based elastomer having a Tg below −30° C. and, correspondingly, zero to about 40 phr of at least one diene-based elastomer having a Tg of −30° C. or above;
   (B) about 0.1 to about 30 phr of corncob granules comprised of granules of the woody ring of corncobs, wherein at least 90 percent of said corncob granules have an average diameter in a range of from about 20 to about 500 microns;
   (C) about 30 to about 110 phr of reinforcing filler comprised of:
      (1) from about 30 to about 80 phr of amorphous, synthetic precipitated silica aggregates containing hydroxyl groups on the surface thereof and
      (2) from about 30 to about 80 phr of rubber reinforcing carbon black, and
   wherein said rubber composition additionally contains a coupling agent having a moiety reactive with hydroxyl groups on said corncob granules and said hydroxyl groups on said precipitated silica and another moiety interactive with at least one of said conjugated diene-based elastomer(s).

2. The tire of claim 1 wherein the rubber composition of said tread running surface additionally contains from about 0.5 to about 10 phr of short fibers comprised of at least one of glass fibers and organic fibers selected from nylon, aramid, rayon, cellulose fibers and wood fibers.

3. The tire of claim 2 where the said coupling agent for said rubber composition is selected from a bis-(trialkoxysilylalkyl) polysulfide having from 2 to about 8 connecting sulfur atoms in its sulfur bridge with about 2 to about 4 connecting sulfur atoms in its sulfur bridge, alkoxyorganomercaptosilane and blocked alkoxyorganomercaptosilane.

4. The tire of claim 1 wherein the rubber composition of said tread running surface is comprised of:
   (A) about 80 to about 95 phr of at least one conjugated diene-based elastomer having a Tg in a range of from about −40° C. to about −105° C., and, correspondingly, about 5 to about 20 phr of at least one diene-based elastomer having a Tg in a range of from about −30° C. to about −10° C.;
   (B) about 1 to about 20 phr of corncob granules comprised of granules of the woody ring of corneobs, wherein at least 90 percent of said corncob granules have an average diameter in a range of from about 30 to about 300 microns;
   (C) about 50 to about 100 phr of reinforcing filler comprised of:
      (1) from about 30 to about 80 phr of amorphous, synthetic precipitated silica aggregates containing hydroxyl groups on the surface thereof and
      (2) from about 30 to about 80 phr of rubber reinforcing carbon black.

5. The tire of claim 4 wherein the rubber composition of said tread running surface additionally contains:
   (A) about 0.5 to about 10 phr of a coupling agent having a moiety reactive with hydroxyl groups on said corncob granules and said hydroxyl groups on said precipitated silica and another moiety interactive with at least one of said conjugated diene-based elastomer(s), (B) about 0.5 to about 5 phr of short fibers comprised of at least one of glass fibers and organic fibers selected from nylon, aramid, rayon, cellulose fibers and wood fibers;

(C) about 0.1 to about 10 phr of a methylene donor and/or acceptor compound wherein:
  (1) said methylene donor compound is selected from at least one of hexamethoxymethyolmelamine, hexaethoxymethylmelamine, ethoxymethylpyridinium chloride, N,N'N"-trimethylolmelamine, N-methylolmelamine, N',N"-dimethylolmelamine and hexamethylenetetramine, and
  (2) said methylene acceptor compound is selected from at least one of resorcinol, resorcinol monobenzoate, phenolic cashew nut oil resin and polyhydric phenoxy resin, and/or (D) sorbitan ester selected from at least one of sorbitan stearate, sorbitan monooleate, sorbitan dioleate and sorbitan laurate.

6. The tire of claim 5 wherein the running surface of said tire is configured with a plurality of longitudinal, circumferential rubber zones wherein at least one of said zones is said rubber composition.

7. The tire of claim 6 with a tread having a running surface configured with a plurality of longitudinal circumferential tread zones in an axially disposed relationship to each other, wherein:
  (A) said at least one of said rubber zones is positioned adjacent to an additional circumferential longitudinal rubber tread strip which does not contain said corncob granule protrusions, or corncob granule protrusion-generated micro-cavities, or
  (B) said at least one of said rubber zones is positioned on the centerline of the tread between two additional circumferential longitudinal rubber tread strips which do not contain said corncob granule protrusions or corncob granule protrusion-generated micro-cavities, or
  (C) said at least one of said rubber zones is positioned adjacent to an additional tread rubber strip wherein said additional tread rubber strip is positioned on the centerline of the tire tread and does not contain said corncob granule protrusions or corncob granule protrusion-generated micro-cavities.

8. The tire of claim 1 wherein said tread running surface contains micro-protrusions of said corncob granules embedded in its said running surface.

9. The tire of claim 8 wherein said tread running surface contains said corncob micro-protrusions and further contains corncob protrusion-generated micro-cavities in its running surface.

10. The tire of claim 8 wherein said tire tread rubber composition is exclusive of closed cell foam rubber.

11. The tire of claim 8 wherein said tire tread rubber composition is further comprised of a closed cell-containing rubber.

12. The tire of claim 1 wherein the running surface of said tire is configured with a plurality of longitudinal, circumferential rubber zones wherein at least one of said rubber zones is said rubber composition.

13. The tire of claim 12 with a tread having a running surface configured with a plurality of longitudinal circumferential tread zones in an axially disposed relationship to each other, wherein:
  (A) said at least one of said rubber zones is positioned adjacent to an additional circumferential longitudinal rubber tread strip which does not contain said corncob granule protrusions, or corncob granule protrusion-generated micro-cavities, or
  (B) said at least one of said rubber zones is positioned on the centerline of the tread between two additional circumferential longitudinal rubber tread strips which do not contain said corncob granule protrusions or corncob granule protrusion-generated micro-cavities, or
  (C) said at least one of said rubber zones is positioned adjacent to an additional tread rubber strip wherein said additional tread rubber strip is positioned on the centerline of the tire tread and does not contain said corncob granule protrusions or corncob granule protrusion-generated micro-cavities.

14. The tire of claim 1 wherein said diene-based elastomer with Tg below $-30°$ C. is at least one elastomer, so long as it has a Tg below $-30°$ C., selected from high cis 1,4-polybutadiene containing at least 92 percent cis 1,4-structure, medium cis 1,4-polybutadiene having about 35 to about 45, percent cis 1,4-structure, medium vinyl polybutadiene having about 40 to about 70 percent vinyl 1,2-content, cis 1,4-polyisoprene, isoprene/butadiene copolymers, styrene/butadiene copolymers, styrene/isoprene copolymers and styrene/isoprene/butadiene terpolymers.

15. The pneumatic tire of claim 1 wherein the tire includes a cord reinforced rubber composition also comprising said rubber composition wherein the cord thereof is a cord of at least one filament selected from glass filaments and organic filaments selected from nylon, aramid, polyester and rayon filaments.

16. The tire of claim 1 wherein the rubber composition of said tread running surface additionally contains a methylene donor and acceptor compound, wherein:
  (A) said methylene donor compound is selected from at least one of hexamethoxymethyolmelamine, hexaethoxymethylmelamine, ethoxymethylpyridinium chloride, N,N'N"-trimethylolmelamine, N-methylolmelamine, N',N"-dimethylolmelamine and hexamethylenetetramine, and
  (B) said methylene acceptor compound is selected from at least one of resorcinol, resorcinol monobenzoate, phenolic cashew nut oil resin and polyhydric phenoxy resin.

17. The tire of claim 16 wherein the rubber composition of said tread running surface additionally contains a sorbitan ester.

18. The tire of claim 1 wherein the rubber composition of said tread running surface additionally contains a sorbitan ester.

\* \* \* \* \*